Figure 1:
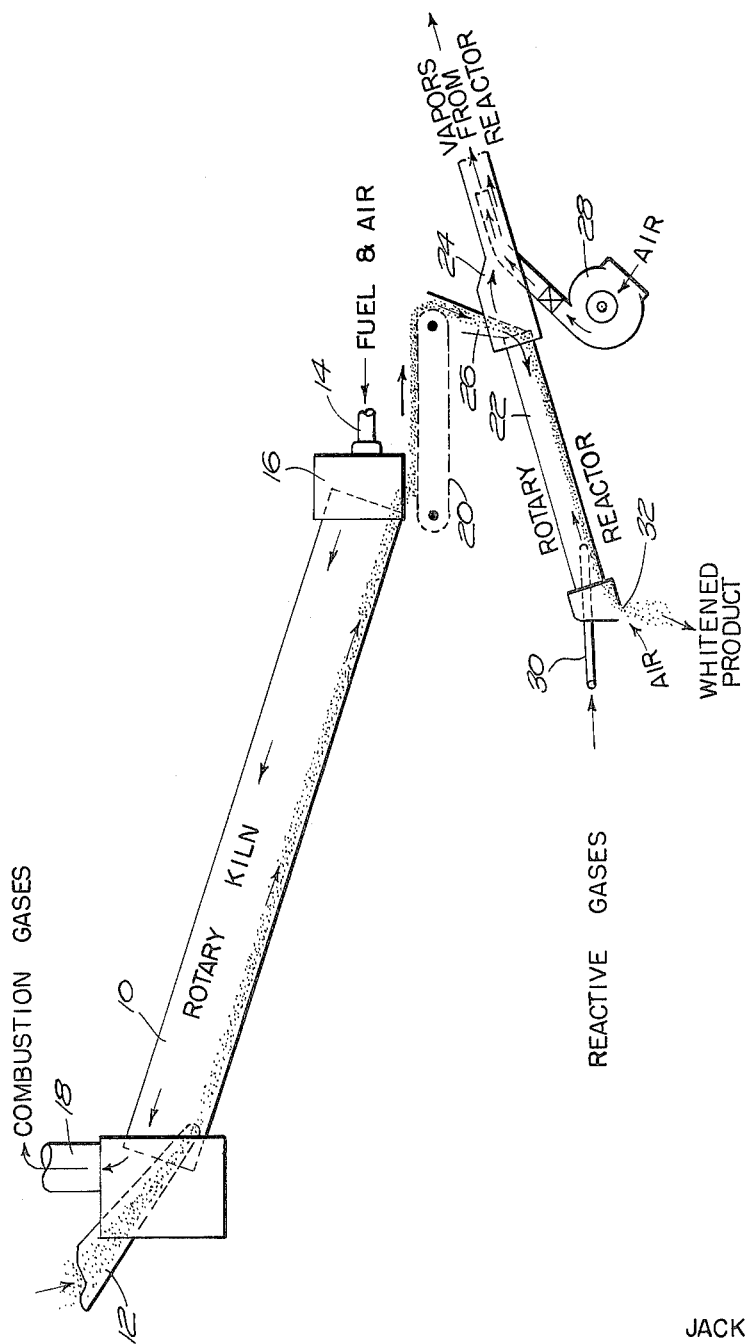

INVENTORS
JACKSON C. MOORE
BY SANFORD C. LYONS

ATTORNEYS great# United States Patent Office 3,236,606
Patented Feb. 22, 1966

3,236,606
APPARATUS FOR WHITENING CLAY
Jackson C. Moore, Macon, Ga., and Sanford C. Lyons, Bennington, Vt., assignors to Georgia Kaolin Company, Elizabeth, N.J., a corporation of New Jersey
Filed June 13, 1960, Ser. No. 35,563
2 Claims. (Cl. 23—262)

This invention relates to a process and apparatus for whitening clay, and more especially kaolinitic clay. For many commercial uses of kaolinitic clay it has been and is highly desirable to employ clay having the maximum whiteness and brightness obtainable. Most kaolinitic clays in the natural state are discolored to some extent by the presence of ferro-titanic mineral impurities which cannot be dissolved at ordinary temperatures or in aqueous suspension by any known chemicals at concentrations which would not first dissolve the kaolin itself. This is especially true of the secondary or sedimentary deposits of clay.

It has long been known that kaolinitic clay can be considerably brightened and whitened by being calcined at temperatures of 600° to 1200° C. This is recognized in the U.S. patent to Rowland, No. 2,307,239, which patent also mentions a further increase in whiteness obtainable by calcining in the presence of chlorine-containing compounds. The whiteness obtainable by these methods, however, left considerable to be desired when compared with the whitest industrial pigments, such as calcium carbonate or $TiO_2$, so that for the whitest purposes calcined clays were not adquate, even when the calcining was done in the presence of chlorine-containing compounds. Morever, the use of such compounds during the calcining operation is not feasible as an industrial practice. For example, mixing compounds such as calcium chloride, sodium chloride or the like with kaolin prior to calcination results in highly undesirable sintering together and/or agglomeration of the clay particles, with the result that the product requires severe and expensive grinding after calcination to restore any semblance of the prior particle fineness of the clay.

Calcination in a chlorine atmosphere has been suggested, but such a process is highly impractical for several reasons. The usual and accepted way of calcining clay is to subject the clay to a flow of highly-heated gases as the clay progresses through a rotary kiln. The volume of such gases is great so that if a reactive gas were used its concentration would be very low and its utilization most inefficient. Furthermore, since the requisite volume of fuel gases varies from time to time with the inherent nature of the clay to be calcined, and since this variation cannot be fully correlated with the requisite amount of reactive gas, the matter of reagent control becomes most complex and its efficient regulation is practically impossible.

It would be desirable, in the interests of reagent economy, to be able to recycle the reactive gases to some degree in order to obtain more complete utilization thereof. However, with the presence of the large amount of combustion gases, this becomes totally impractical even if there were not also the further problem of removal of entrained dust from these combustion gases which sweep through the kiln at such a rate as to pick up a considerable amount of clay.

Another factor of practical economic significance is the fact that all kilns suitable for the calcination of clays at the above noted temperatures and on the indicated scale of several tons per hour of clay, are large and complex units. This is true whether they are designed along lines of the conventional cylindrical, rotary cement kiln or along the lines of the multihearth Herreschoff furnace.

In consideration of the cost involved, such units are always built essentially of ordinary mild steel, like boilerplate and/or structural steel. These steel structures are lined, of course, at points where temperatures are high, with suitable refractories such as fire clay brick or the like. Because of the size and the very considerable weights involved in these large units, it is scarcely practicable to provide the moving parts with precision closures between the stationary members and the confronting rotary members. There is inevitable leakage of combustion gases at various points. This, while not desirable, is not a serious matter because the hot gases are not toxic nor are they significantly corrosive. If, however, corrosive gases of the nature of chlorine and/or its compounds were to be introduced into such a furnace in any significant proportion, the corrosive attack on the steel parts would be ruinous. The alternative of constructing the units of some type of non-corrosive steel would be prohibitive—if, indeed, a suitable stainless steel could be found.

This matter of handling of large volumes of corrosive gases would be obviously intolerable from an engineering standpoint if a dust-collector were to be used in series with the calciner.

In the ordinary calcination of kaolins, all of the products of combustion are volatile and of insignificantly corrosive character. They may be either exhausted directly into the atmosphere without detrimental effect to personnel or surrounding equipment, or they could be put through a conventional dust-collector after suitable reduction of temperature as by blending in cold air.

However, in vapor-phase reactions of the instant type between chlorine-containing gaseous compounds and ferro-titanic type impurities (which are the principal source of discolorization of the clay), there is produced a by-product from the chemical reaction between the chlorine-containing gaseous compounds and the hot ferro-titanic minerals which is volatile at the temperatures of calcination, e.g. 700° to 1000° C. This material tends, however, to condense out on surrounding surfaces at lower temperatures, e.g., 250° C., and poses a substantial problem in connection with its progressive collection and removal from the sphere of reaction and operation. Obviously, if one were to try to pass the combustion gases containing this material from an ordinary kiln operation through a conventional dust-collector, the results would be disastrous. The reaction product would condense out on the collectors or even within the throats of the conduits of the collectors.

Accordingly, in the light of the severe engineering problems thus involved, little progress toward production of extremely white calcined clays by processing in chlorine atmospheres has heretofore been made.

Figure 2:
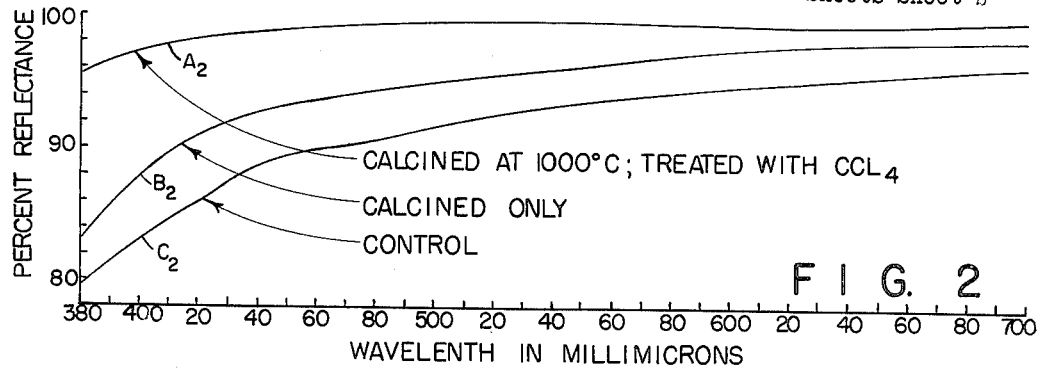
Figure 3:
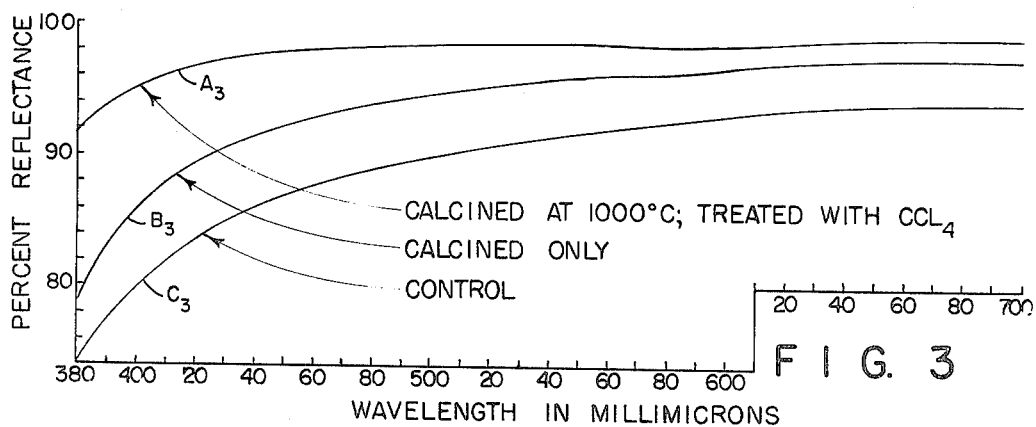
Figure 4:
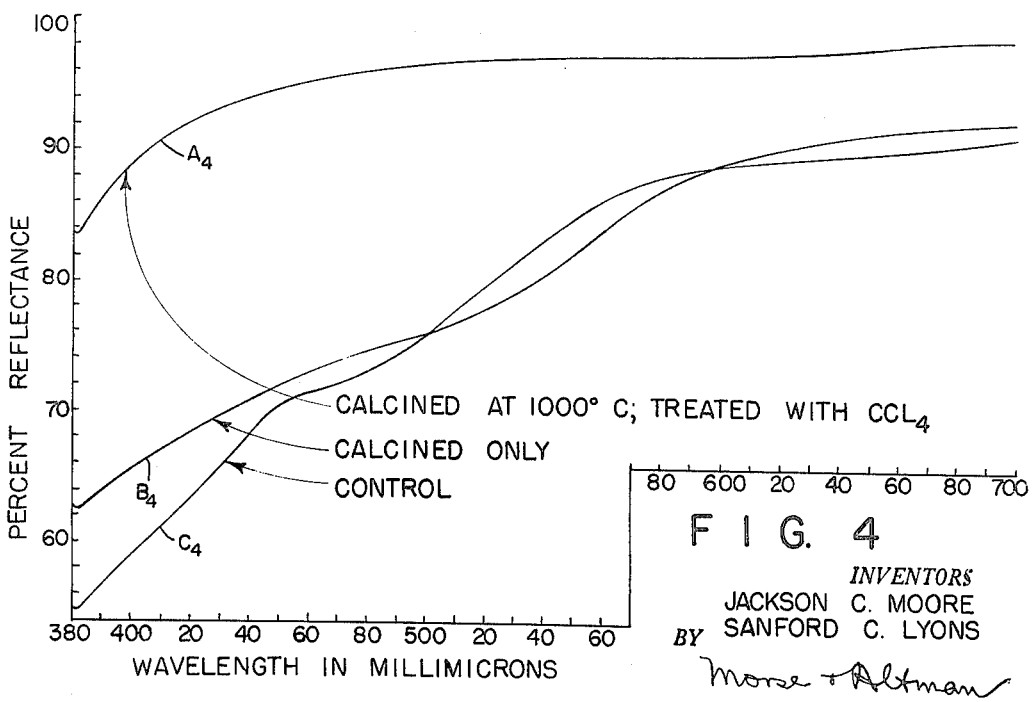

We have discovered a new and more efficient process of whitening calcined kaolins by means of vapor-phase treatments using chlorine-containing gases at high temperatures and relatively high concentrations. Our new process, hereinafter described, is not only efficient but is economical and can be closely controlled. For a more complete understanding thereof, reference may be had to the following description thereof, and to the drawing, of which FIGURE 1 is a diagrammatic representation of apparatus for whitening clay; and FIGURES 2, 3 and 4 are graphs of spectrophotometric analyses of the brightness and whiteness of samples of kaolinitic clays which have been subjected to various whitening treatments.

In FIGURE 1 a standard rotary kiln is indicated at 10, the kiln being inclined so that koalin introduced by a chute 12 at the upper end travels downward toward the lower end as the kiln rotates. Fuel and air introduced by a pipe or pipes 14 into a chamber 16 at the lower end of the kiln send a stream of flame and highly heated combustion gases up through the kiln to be discharged through an exhaust duct 18.

The clay in the kiln 10 is heated to incandescence or near incandescence as it advances toward the discharge end by the counter-flow of highly heated combustion gases. The incandescent or nearly incandescent clay falls from the kiln onto a suitable heat-resistant conveyor, conventionally indicated at 20, from which it is quickly discharged into a relatively small, inclined rotary reactor 22. At the beginning of an operation the hot clay which is introduced into the reactor soon brings the temperature of the interior of the reactor up to the necessary point without any further introduction of heat other than that supplied by the continued inflow of calcined clay from the kiln. Thus no problem of combustion gases is involved. A hood or duct 24 surrounds the upper or feed end of the reactor 22, an opening being provided for a chute 26 by which the clay is guided from the kiln into the reactor. A jet of air pumped into the hood 24 by a pump 28 maintains an upward draft through the reactor 22 after it has been brought up to the proper temperature. Reactive gases are drawn up through the reactor from a supply pipe 30 at the lower or discharge end of the reactor to quench the hot clay and to react with the off-color impurities therein so as to brighten and whiten the clay.

The dosage of reactive vapor will vary with different clays, but is easily and accurately regulated in correlation with the requirement of the calcine which moves through the reactor at a uniform rate. The adequacy of dosage is determined at intervals by measuring the color of the reacted product, and also by determining the proportion of unreacted chlorine in the exhaust gases.

If the reaction is efficiently handled, the dosage of chlorine or carbon tetrachloride may be only 2% or 3% by weight of the clay. However, if the operation is improperly regulated, the reagent consumption may run to two or three times this amount.

We have found that the bleaching action of the chlorine is more effective and complete if a small proportion of carbon is present with the chlorine and also if a little air or oxygen-containing gas such as carbon monoxide or dioxide is present. Hence we may supply through the pipe 30 carbon tetrachloride, a mixture of chlorine and methane, or any other gas or mixture of gases containing chlorine predominantly with a small proportion of carbon. Air is drawn in through a discharge port 32 through which the treated clay escapes from the reactor 22. The gaseous reaction products are discharged from the hood 24 into suitable apparatus (not shown) by which the condensable products are condensed and the residual reactive gases may be prepared for recycling.

While a conventional rotary kiln is indicated in FIGURE 1, any other calcining apparatus such as a multiple hearth type furnace can be used to heat the clay for quenching as described. Since no reactive gases are introduced during the heating operation, the temperature regulating devices are not encumbered, and can be adjusted as desired for the most efficient thermal treatment.

Calcination intensity will vary somewhat with the purpose for which the product is destined. For certain purposes a product temperature of only 700° C. may be sufficient, but for most applications, particularly those requiring the brightest and whitest product obtainable, a temperature of about 1000° C. is necessary.

The reactor 22, being comparatively small, can be made or lined (as a practical matter) with material resistant to chemical attack by chlorine-containing compounds at high temperatures. For this purpose alumina or silica, formed into special shapes, or other corrosion-resistant materials such as acid-proof cement give good service.

The impressive results of the quenching treatment hereinbefore described, applied to three different types of clay are illustrated by the graphs in FIGURES 2, 3 and 4. These graphs show the percentages of reflectance from the product at wave-lengths from 380 to 700 millimicrons. Perfect whiteness would be represented by a straight horizontal line. Perfect brightness for any wave-length would be represented by a corresponding point on the "100" line at the top of the sheet. The brightness index for a product is taken as the figure for the wave-length 457 millimicrons. The whiteness index is taken as the difference between the readings for 400 and 700 millimicrons. Thus the index for perfect whiteness would be zero. These figures were arbitrarily adopted, as representing the practical limits of the visible range of light waves, in "Paper Coating Pigments" by S. C. Lyons, page 69, published 1958 by Technical Association of the Pulp and Paper Industry.

The curves in FIGURE 2 represent spectrophotometer analyses of samples from a batch of special clay prepared by fractionating washed clay and subjecting the "stacks" fraction (over 2 mu equivalent spherical diameter) to severe shearing stresses in the manner described in Patent No. 2,904,267, granted September 15, 1959, which split many of the particles into sizes under 2 mu. These fines were separated from the coarser remaining fraction and constituted a product of surprisinig whiteness and brightness. A sample of this product was heated to 1000° C., then quenched by carbon tetrachloride vapor and air. The resulting brightness and whiteness is indicated by the curve $A_2$ in FIGURE 2. This curve indicates a brightness index of 98.9 and a whiteness index of 2.3.

The best figures obtained from similar tests on the highest grade of pure calcium carbonate and titanium dioxide were:

|  | Brightness index | Whiteness index |
| --- | --- | --- |
| Calcium carbonate | 97.3 | 2.7 |
| Titanium dioxide | 96.5 | 7.0 |

The brightness and whiteness of a second sample of the same clay, after being heated to 1000° C., but not treated with reactive gas, are indicated by the curve $B_2$ which shows a brightness index of 93.5 and a whiteness index of 10.3.

The curve $C_2$ shows the whiteness and brightness of a third sample of the same clay which was given no further treatment. This shows a brightness index of 89.3 and a whiteness index of 12.7.

The curves in FIGURE 3 represent properties of three samples from a batch of conventional paper-coating clay, that is, water-washed, fine-particle, high-grade clay which has been chemically decolorized by conventional methods.

The first sample was quenched with carbon tetrachloride vapor after being heated to 1000° C. The curve $A_3$ shows a resulting brightness index of 98, and a whiteness index of 3.7. The second sample was heated to 1000° C. without subsequent exposure to reactive gas. The curve $B_3$ shows a brightness index of 92.5 and a whiteness index of 11.7 for this sample. The curve $C_3$ for the control sample which was not treated gives a brightness index of 87.5 and a whiteness index of 14.9.

The curves in FIGURE 4 represent properties of three samples from a batch of a yellowish crude clay. The first sample was heated to 1000° C., then treated while hot with carbon tetrachloride vapor. The curve $A_4$ shows a brightness index of 95, and a whiteness index of 9.8. The second sample was heated to 1000° C. without subsequent exposure to a reactive gas. The resultant curve $B_4$ shows a brightness index of 72.7 and a whiteness index of 27.1. The control sample as indicated by the curve $C_4$ had a brightness index of 71.4 and a whiteness index of 32.4.

Tabulating for comparison the indices for the clay samples which were treated according to the present invention:

|  | Brightness index | Whiteness index |
|---|---|---|
| Bleached, mechanically split fines ($A_2$) | 98.9 | 2.3 |
| Bleached and washed fines ($A_3$) | 98.0 | 3.7 |
| Yellowish crude ($A_4$) | 95.0 | 9.8 |

These figures, and the curves from which they are taken, indicate how very effective the herein described method of treating clay is. Even off-color crude clay when so treated becomes almost as white and bright as calcium carbonate and titanium dioxide which have heretofore been considered to be the brightest and whitest of commercial pigments. Both of the latter are clearly surpassed by the bleached and mechanically split fines which have been treated as herein described. Such treatment is not only much more effective for the purpose than any previously known, but is relatively inexpensive and commercially feasible.

We claim:

1. Apparatus for bleaching clay, comprising means for heating clay, means for continuously feeding clay to said heating means, means for injecting fuel and air into said heating means whereby said clay is heated to a temperature between 600° and 1200° C., means for receiving said clay from said heating means and continuously exposing said clay to the open atmosphere whereby the combustion gases used to heat the clay are substantially eliminated, an inclined rotary reactor below said heating means open to the atmosophere at both ends and adapted to receive hot clay discharged into the open atmosphere from said heating means, the interior of said reactor from end to end being of material resistant to hot chlorine-containing gaseous compounds, means for introducing a stream of chlorine-containing gaseous compound into the lower end of said reactor, a duct partly surrounding the upper end of said reactor and leading away therefrom and means for blowing a stream of air into said duct in a direction away from said reactor whereby to aspirate gases from the upper end of said reactor and thereby maintain a countercurrent flow of hot clay and hot chlorine-containing gaseous compounds therein.

2. The apparatus of claim 1 wherein said means for heating clay comprises an inclined rotary kiln and wherein the clay is fed to said kiln adjacent its upper end and wherein the fuel and air are injected adjacent the lower end of said kiln.

References Cited by the Examiner
UNITED STATES PATENTS

| | | | |
|---|---|---|---|
| 658,727 | 9/1900 | Naef | 23—279 |
| 1,031,498 | 7/1912 | Whitney | 23—110 |
| 1,658,457 | 2/1928 | Moldenke | 23—262 |
| 1,977,238 | 10/1934 | Mitchell | 23—262 |
| 1,999,773 | 4/1935 | McMichael | 23—110 |
| 2,307,239 | 1/1943 | Rowland | 106—72 X |
| 2,504,357 | 4/1950 | Swallen | 23—110.2 X |
| 3,037,940 | 6/1962 | Pixley et al. | 263—32 X |

MORRIS O. WOLK, *Primary Examiner.*

GEORGE D. MITCHELL, MAURICE A. BRINDISI, JAMES H. TAYMAN, JR., *Examiners.*